United States Patent
Ratasuk et al.

(10) Patent No.: US 11,924,886 B2
(45) Date of Patent: Mar. 5, 2024

(54) CONFIGURATION OF TRANSPORT BLOCK SIZE

(71) Applicant: NOKIA TECHNOLOGIES OY, Espoo (FI)

(72) Inventors: Rapeepat Ratasuk, Hoffman Estates, IL (US); Nitin Mangalvedhe, Hoffman Estates, IL (US); Haitao Li, Beijing (CN); Hua Chao, Shanghai (CN); David Bhatoolaul, Swindon (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 610 days.

(21) Appl. No.: 17/048,509

(22) PCT Filed: Apr. 16, 2018

(86) PCT No.: PCT/CN2018/083240
§ 371 (c)(1),
(2) Date: Oct. 16, 2020

(87) PCT Pub. No.: WO2019/200519
PCT Pub. Date: Oct. 24, 2019

(65) Prior Publication Data
US 2023/0133527 A1    May 4, 2023

(51) Int. Cl.
*H04L 12/50*    (2006.01)
*H04W 52/36*    (2009.01)
*H04W 74/08*    (2009.01)

(52) U.S. Cl.
CPC ..... *H04W 74/0841* (2013.01); *H04W 52/367* (2013.01); *H04W 74/0866* (2013.01)

(58) Field of Classification Search
CPC .. H04W 52/367; H04W 74/0866; H04L 12/28
USPC ................. 370/329, 400, 401, 395
See application file for complete search history.

(56) References Cited

U.S. PATENT DOCUMENTS

2010/0182964 A1    7/2010    Ojala et al.
2022/0394777 A1*   12/2022   Ahn ................. H04W 74/0833

FOREIGN PATENT DOCUMENTS

CN    101743727 A    6/2010
CN    104640212 A    5/2015

OTHER PUBLICATIONS

"Reply LS to RAN1 on Early Data Transmission", 3GPP TSG RAN WG2 Meeting #101, R2-1803884 (Mar. 2018), 2 pages.
(Continued)

*Primary Examiner* — Dang T Ton
(74) *Attorney, Agent, or Firm* — ALSTON & BIRD LLP (57) ABSTRACT

Embodiments of the present disclosure relate to methods, devices and computer readable storage medium for transport block size (TBS) configuration. In example embodiments, a terminal device transmits a random access preamble to a network device. The terminal device receives a random access response from the network device. The random access response includes a resource allocated for a reference TBS. Based on the reference TBS, the terminal device determines a TBS for transmitting data to the network device. Then, the terminal device transmits the data to the network device by using the determined TBS and the allocated resource. This TBS configuration is more flexible.

19 Claims, 4 Drawing Sheets

(56) References Cited

OTHER PUBLICATIONS

Ericsson, "Data Transmission During Random Access Procedure for NB-IoT", 3GPP TSG RAN WG1 Meeting #92, R1-1801491 (Mar. 2018), 4 pages.
Huawei et al., "Feature Lead Summary of EDT During RACH in feNB-IoT", 3GPP TSG RAN WG1 Meeting #92, R1-1803007 (Mar. 2, 2018), 8 pages.
International Search Report and Written Opinion for Patent Cooperation Treaty Application No. PCT/CN2018/083240 dated Jan. 7, 2019, 6 pages.
MediaTek Inc., "Early Data Transmission TBS Determination", 3GPP TSG RAN WG1 Meeting #92, R1-1801686 (Mar. 2018), 6 pages.
Nokia et al., "Data Transmission During Random Access Procedure", 3GPP TSG RAN WG1 Meeting #92, R1-1802267 (Mar. 2018), 4 pages.
ZTE, "Consideration on System Acquisition Time Reduction for NB-IoT", 3GPP TSG RAN WG1 Meeting #89, R1-1707095 (May 19, 2017), 6 pages.
Extended European Search Report for European Application No. 18915581.5 dated Nov. 17, 2021, 6 pages.
Ericsson, "TB Sizes and UL Grant for Msg3", 3GPP TSG-RAN WG2 #101, R2-1803080, (Feb. 26-Mar. 2, 2018), 7 pages.
First Examination Report for Indian Application No. 202047048586 dated Jun. 16, 2022, 6 pages.
Office Action for Indonesian Application No. P00202008528 dated Feb. 22, 2023, 4 pages.
Office Action for European Application No. 18915581.5 dated Jun. 9, 2023, 5 pages.
Office Action for Chinese Application No. 201880094331.2 dated Jun. 26, 2023, 18 pages.
Office Action for Mexico Application No. MX/a/2020/010917 dated Sep. 26, 2023, 10 pages.

\* cited by examiner

One DFT, 4 separate eNB receiver processing (channel estimation, equalization demodulation, LLR calculation), then rate-matching and soft-combining and into 4 separate buffers

CONFIGURATION OF TRANSPORT BLOCK SIZE

CROSS-REFERENCE TO RELATED APPLICATIONS

This application is a national phase entry of International Application No. PCT/CN2018/083240, filed Apr. 16, 2018, the entire contents of both of which are incorporated herein by reference.

FIELD

Embodiments of the present disclosure generally relate to the field of communications, and in particular, to methods, devices and computer readable storage medium for transport block size (TBS) configuration.

BACKGROUND

In the 3rd Generation Partnership Project (3GPP) specifications, Early Data Transmission (EDT) has been proposed for enhanced machine-type communication (eMTC) and Narrowband Internet of Things (NB-IoT). In uplink (UL), the EDT allows data to be transmitted on Message 3 (Msg3) during a random access procedure. For example, user equipment (UE) may use a reserved preamble to indicate to an evolved NodeB (eNodeB or eNB) that the UE intends to perform the EDT, and then the eNB will allocate Msg3 resources for the EDT. With the EDT, interactions between the UE and the eNB may be significantly decreased, and therefore the latency and overhead of the UL data transmission may be reduced.

One concern on the EDT is that the eNB is unaware of the amount of data to be transmitted by the UE. Thus, if the eNB allocates a TBS that is too large, the UE has to pad a transport block (TB) with a lot of bits. For example, if the eNB allocates a TB of 1000 bits but UE only has 504 bits of data to transmit, the UE would have to pad the transport block with 496 bits. This may result in a lot of resource waste.

To mitigate the resource waste due to the padding, it is agreed to allow the UE to autonomously select an appropriate TBS, Modulation and Coding Scheme (MSC), Resource Unit (RU), number of repetitions or an appropriate combination of those transmission related parameters based on the amount of UL data to be transmitted. For example, the UE may choose an appropriate TBS from a set of TBSs based on the UL data and may also determine the appropriate MCS, repetitions and RUs (for Narrowband Internet of Things (NB-IoT) technology).

In the 3GPP standardization, how to provide the set of possible TB sizes, MCS, repetitions and RUs (for NB-IoT) are being discussed for hardcoding in the 3GPP specifications. One proposal assumes 8 possible candidate values for the maximum TBS which are broadcasted in system information. For each candidate value of the maximum TB size, up to 4 possible TBSs are allowed, which means 4 possible blind decoding options at the eNB. In this case, if the eNB indicates the maximum TBS, the UE may choose a TBS from the four possible TB sizes for the maximum TBS.

SUMMARY

In general, example embodiments of the present disclosure provide methods, devices and computer readable storage medium for TBS configuration.

In a first aspect, a method at a terminal device is provided. The terminal device transmits a random access preamble to a network device. The terminal device receives a random access response from the network device. The random access response includes a resource allocated for a reference TBS. Based on the reference TBS, the terminal device determines a TBS for transmitting data to the network device. Then, the terminal device transmits the data to the network device by using the determined TBS and the allocated resource.

In a second aspect, a method at a network device is provided. The network device receives a random access preamble from a terminal device. The network device transmits a random access response to the terminal device, the random access response including a resource allocated for a reference TBS for data transmission of the terminal device. The network device detects data from the terminal device in the allocated resource.

In a third aspect, there is provided a device comprising at least one processor and at least one memory including computer program code. The at least one memory and the computer program code are configured to, with the at least one processor, cause the device to perform the method according to the first or second aspect.

In a fourth aspect, there is provided a computer readable storage medium that stores a computer program thereon. The computer program, when executed by a processor, causes the processor to perform the method according to the first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, machine type communication (MTC), enhanced mobile broadband (eMBB), massive machine type communication (mMTC), ultra reliable low latency communication (uRLLC) and EDT technologies. For the purpose of discussion, some embodiments are discussed in the scenario where the EDT technology is utilized.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, in order to improve the resource efficiency, for the EDT, the UE is allowed to autonomously select an appropriate TBS/MCS/RU/repetitions based on the UL data to be transmitted. For instance, if the eNB indicates the maximum TBS of 1000 bits but the UE only has 504 bits of data to be transmit, the UE may choose the TBS of 504 bits instead of the indicated maximum TBS.

However, the eNB is unaware of the TBS selected by the UE. Thus, the processing of the eNB for blind decoding may become very complicated. If 4 possible TBSs are allowed for a candidate value of the maximum TBS, the eNB may have to perform up to 4 blind decoding attempts on each Physical Uplink Shared Channel (PUSCH) transmission. This may considerably increase complexity of receiver processing at the eNB.

For the NB-IoT, a resource usage indicator may be defined, for example, 2-bit indicator using Narrow-band Physical Uplink Shared Channel (NPUSCH) Format 2, to explicitly notify the eNB of the selected TBS prior to NPUSCH transmission. However, such explicit notification may not be allowed in the random access (RA) procedure for the EDT.

One conventional approach for the EDT provides fallback to a legacy Random Access Channel (RACH) procedure. For example, if the TBS indicated by the EDT UL grant is significantly greater than the UL data packet, the UE may fall back to the legacy RACH procedure and only transmit legacy Msg3. In this case, the EDT cannot be performed.

Another conventional approach for the EDT allows the eNB to allocate simultaneously multiple grants. For example, the eNB may allocate the grants for 328, 680 and 1000 bits of data, and further the UE may select the grant that best fits UL data buffer. This, however, increases random access response (RAR) overhead significantly and will require multiple blind decoding attempts by the eNB.

Embodiments of the present disclosure provide a flexible TBS configuration. After a terminal device transmits a random access request (for example, a RA preamble) to a network device, the network device returns a RAR including a resource allocated for a reference TBS. The reference TBS may be either the maximum TBS configured in system information such as system information block (SIB), or the TBS given in the RAR. The terminal device determines a TBS for UL data transmission based on the reference TBS and then transmits data to the network device by using the determined TBS and the allocated resource.

The reference TBS included in the RAR may be more adapted to the immediate UL data transmission, in particular, compared with the maximum TBS broadcast. Such TBS configuration is more flexible. Accordingly, the resource waste may be mitigated and the power efficiency may be increased.

Figure 1:
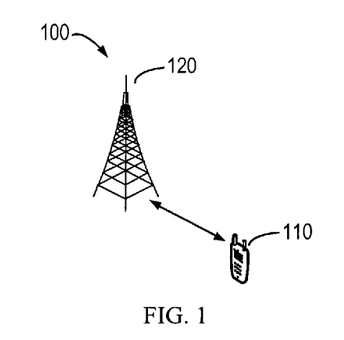
FIG. 1 illustrates an example communication network in which embodiments of the present disclosure can be implemented.

FIG. 1 illustrates an example communication network 100 in which embodiments of the present disclosure can be implemented. The network 100 comprises a terminal device 110 and a network device 120. It is to be understood that the numbers of network devices and terminal devices are shown only for the purpose of illustration without suggesting any limitation. The network 100 may include any suitable numbers of network devices and terminal devices.

The terminal device 110 may communicate with the network device 120 or with a further terminal device (not shown) via the network device 120. The communication may utilize any suitable technology that already exists or will be developed in the future. In some embodiments, the terminal device 110 may be implemented by an eMTC or NB-IoT UE which communicates with the network device 120 using the EDT technology.

In various embodiments of the present disclosure, during the RA procedure, the terminal device 110 receives from the network device 120 an RAR that includes a resource allocated for a reference TBS. The terminal device 110 may autonomously determine a TBS for uplink data transmission based on the reference TBS, and then transmit the data by using the determined TBS and the allocated resource. The detailed operations and acts of the terminal device 110 and the network device 120 will be described with reference to FIG. 2.

Figure 2:
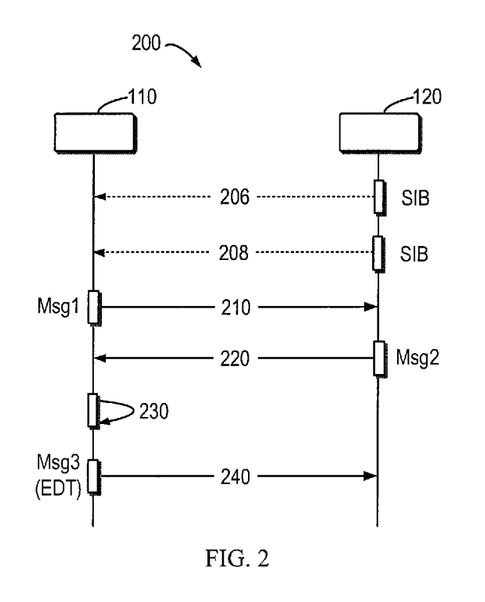
FIG. 2 illustrates an example message flow between the terminal device and the network device according to some embodiments of the present disclosure.

FIG. 2 illustrates an example message flow 200 between the terminal device and the network device according to some embodiments of the present disclosure. The message flow 200 can be implemented between the terminal device 110 and the network device 120 as shown in FIG. 1. For the purpose of discussion, the message flow 200 will be described with reference to FIG. 1.

As shown in FIG. 2, the terminal device 110 transmits (210) a RA request to the network device 120. In this example, the RA request is carried on Message 1 (Msg1). The terminal device 110 may first obtain the resource for the RA request in any suitable way. For example, the network device 120 may reserve some resources for RA requests from served terminal devices. The terminal device 110 may select its own Physical Random Access Channel (PRACH) resource from the reserved resources, for example, based on a coverage enhancement (CE) level that is used.

The RA request may be implemented in any suitable form. For example, the RA request may be implemented by a RA preamble. In some embodiments, a specific or reserved preamble for indicating the EDT to be performed may be used.

As a response to the RA request transmitted (210), the terminal device 110 receives (220) a RAR from the network device 120, for example, on message 2 (Msg2). The RAR includes a reference TBS indication and a radio resource that is allocated for the reference TBS (i.e., the UL grant). In the method flow 200, both the reference TBS and the allocated resource are received in RAR UL grant on Physical Downlink Shared Channel (PDSCH). As an alternative example, the reference TBS may be received in downlink control information (DCI) while the allocated resource is received in the RAR UL grant, which is also part of the DCI.

The reference TBS may be configured by the network device 120 to be more adapted to the immediate UL transmission in order to improve the resource efficiency. For example, the reference TBS may be smaller than a maximum TBS broadcast by the network device 120 in system information. In this example, the network device 120 may broadcast one or more maximum TBSs in the system information (for example, system information block, or SIB). The maximum TBSs may be associated with different CE levels. Accordingly, as shown, the terminal device 110 may detect (208) a maximum TBS broadcast by the network device 120 in the SIB before transmitting (210) the RA request.

In this case, the network device may override the maximum TBS by the reference TBS included in the RAR. For example, if the maximum TBS is configured to be 1000 bits, the network device 120 may override the maximum TBS by the reference TBS of 504 bits in the DCI.

It is possible that the reference TBS is equal to the maximum TBS. The RAR may not include the reference TBS. The maximum TBS broadcast in the SIB acts as the reference TBS.

In various embodiments of the present disclosure, the resource for the following UL transmission is allocated or configured by the network device 120 based on the reference TBS. The resource may include the number of subcarriers/physical resource blocks (PRBs), the number of repetitions, the number of resource units (RUs), and the like.

Based on the reference TBS received (220), the terminal device 110 determines (230) a TBS for transmitting data to the network device 120. For example, the terminal device 110 may determine that the reference TBS is to be used for data transmission.

In order to further improve the flexibility of the TBS configuration, in some embodiments, the terminal device 110 may adjust the reference TBS based on the amount of the data. If the data in the UL buffer is less than the data accommodated by the reference TBS, the UE may determine a smaller TBS for transmitting the data. For example, if the reference TBS is 712 bits and the terminal device 110 has 408 bits of data to transmit, the terminal device 110 may determine a smaller TBS of 408 bits for data transmission. It is possible that the terminal device 110 may determine a larger TBS when the data is more than the reference TBS.

In some embodiments, a set of candidate TBSs may be defined for a reference TBS for the terminal device 110 to select. Table 1 shows example sets of candidate TBSs for different reference TBSs.

TABLE 1

| Reference TBS (bits) | Candidate TBSs (bits) |
|---|---|
| 328 | 328 |
| 408 | 408, 328 |
| 504 | 504, 408, 328 |
| 600 | 600, 504, 408, 328 |
| 712 | 712, 600, 504, 328 |
| 808 | 808, 600, 408, 328 |
| 936 | 936, 712, 504, 328 |
| 1000 | 1000, 712, 504, 328 |

The terminal device 110 may select a TBS from the set of candidate TBSs based on the amount of the data to be transmitted. For example, in the case that the reference TBS is 712 bits and the data to transmit is 408 bits, the terminal device 110 may select the candidate TBS of 504 bits for data transmission. The remaining 96 bits in a TB may be padded by the terminal device 110.

The above TBS adjustment may be enabled or disabled by the network device 120. As shown, the terminal device 110 may receive (206) an indication that the TBS adjustment is enabled by the network device 120. This indication may be broadcast by the network 120 in system information such as the SIB. Upon the reception of this indication, the terminal device 110 determines the amount of the data to be transmitted and then adjusts the reference TBS based on the amount of the data.

In some embodiments, the terminal device 110 may transmit, to the network device 120, an indication that the TBS selection is enabled by the terminal device 110. For example, the terminal device 110 may use a reserved bit in the RA preamble to indicate that the terminal device 110 is capable of autonomous TBS selection. Then, the terminal device 110 may choose whether to perform the TBS selection according to actual needs. Based on this indication, the network device 120 may detect the data based on the candidate TBSs to further reduce the receiver processing complexity.

After the TBS is determined (230), the terminal device 110 transmits (240) the data to the network device 120 by using the determined TBS and the allocated resource. In order to further improve the flexibility of the resource configuration, the terminal device 110 may autonomously determine from the allocated resource a resource for the UL data transmission, and then transmit the data in the determined resource. The determined resource may or may not be the same as the allocated resource.

Similar to the TBS adjustment, the resource adjustment by the terminal device 110 may also be enabled or disabled by the network device 120. For example, when the indication for the TBS adjustment is received (206), the terminal device 110 may also receive an indication that the resource adjustment is enabled by the network device 120.

In order to further improve the resource usage and power efficiency, in some embodiments, the terminal device 110 may adjust the allocated resource based on the determined TBS and the reference TBS. Similar to the TBS adjustment, the resource adjustment (for example, adjusting the number of repetitions, time-frequency resource, or transmission power) may also be enabled or disabled by the network device 120. For example, when the first indication of the TBS adjustment is received (206), the terminal device 110 may also receive an indication that the resource adjustment is enabled by the network device 120.

The terminal device 110 may utilize any suitable resource adjustment techniques. In the embodiments where the allocated resource includes the number of resource elements (REs)/PRBs or RUs, the terminal device 110 may adjust the number of REs/PRBs or RUs. In the embodiments where the allocated resource includes the reference number of repetitions, the terminal device 110 may adjust the number of repetitions.

For example, in the case of the adjustment of the number of repetitions, the terminal device 110 may determine the number of repetitions as a function of the determined TBS and reference TBS values using the equation (1):

$$K=\text{ceil}(Nrep*(TBS\_\text{new}/TBS\_\text{ref})) \quad (1)$$

where TBS_ref represents the reference TBS, TBS_new represents the determined TBS, Nrep represents the reference number of repetitions allocated by the network device 120. The function ceil( ) represents the operation of rounding up Nrep*(TBS_new/TBS_ref) to the nearest integer. If Nrep=64, TBS_ref=1000 and TBS_new=328, then K=21. In this case, the terminal device 110 may determine the number of repetitions as Nrep_new=21.

In some embodiments, the terminal device 110 may select the number of repetitions from a set of candidate numbers of repetitions which is defined or configured in the network 100. For example, K calculated in the equation (1) is considered as a reference number (referred to as a second reference number) of repetitions. Then, the terminal device 110 selects the number for repetitions from the set of candidate numbers of repetitions. In the above case of K=21, if a set of candidate numbers of repetitions {1, 2, 4, 8, 16, 32, 64, 128} is defined, the terminal device 110 may select Nrep_new=32 that is the smallest value greater than or equal to 21.

In some embodiments, after the number of repetitions is selected from the candidate numbers based on the second reference number of repetitions, the terminal device 110 may further determine a transmission power for the selected number of repetitions. For example, the terminal device 110 may adjust the transmission power by:

$$\min(10*\log 10(K/Nrep\_\text{new})+\Delta,0)\text{dB}$$

where the parameter Δ represents power adjustment margin. The value of Δ may be configured according to actual needs. The transmission power may be adjusted as a function of the selected and reference TBS values or as a function of the selected and reference number of repetitions.

For example, Δ=0.5. In the case that K=21 but the number of repetitions is selected as Nrep_new=32, the terminal device 110 may adjusts its UL transmission power by 10*log 10(21/32)+0.5=−1.3 dB.

Similar to the TBS and resource adjustments, the power adjustment may also be enabled by the network device 120. For example, as shown in FIG. 2, the terminal device 110 may receive (206) a further indication that the power adjustment is enabled by the network device 120.

It is to be understood that although some embodiments are described in the scenario of the EDT, other grant-free scenarios are also applicable. In those scenarios, after the network device 120 configures certain set of resources based on a reference TBS, the terminal device 110 may also adjust the resources accordingly.

Compared with the adjustment of REs/PRBs/RUs, the adjustment of the number of repetitions allows low-complexity of the receiver processing at the network device 120. The comparison of the processing complexity will be discussed below with reference FIGS. 3(a), 3(b) and 3(c) which illustrate example processing for blind decoding attempts at the network device 120 when the terminal device 110 uses different adjustment techniques.

Figure 3A:
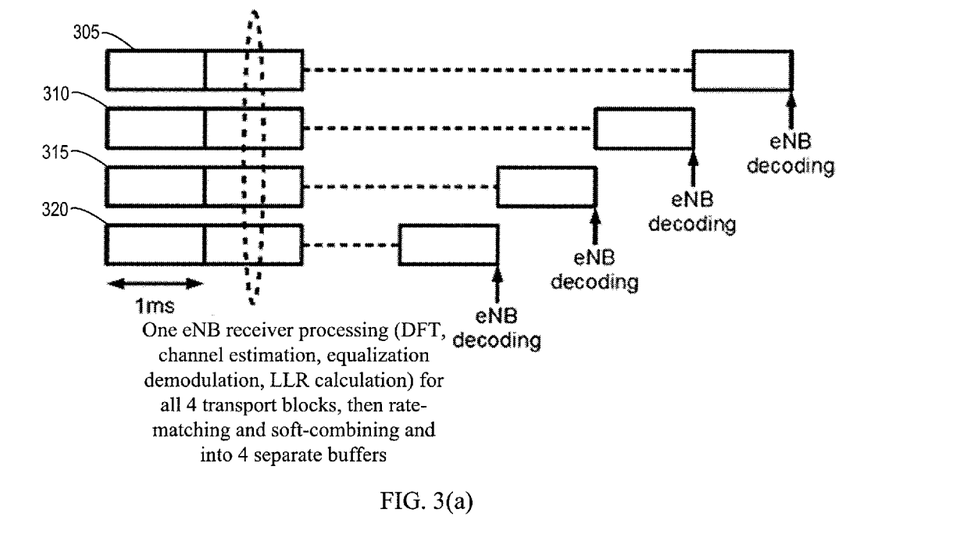
FIG. 3(a) illustrates example processing for blind decoding attempts with different numbers of repetitions according to some embodiments of the present disclosure.

FIG. 3(a) shows example processing for blind decoding attempts with different numbers of repetitions. As shown in FIG. 3(a), in the case that the number of repetitions is adjusted, for four different candidate TBSs 305, 310, 315 and 320, the same receiver processing is performed, which may involve Discrete Fourier Transform (DFT), channel estimation, equalization, demodulation, Log Likelihood Ratio (LLR) calculation, Turbo Decoding, for example. Then, separate rate-matching and soft-combining are performed for the different candidate TBSs 305, 310, 315 and 320. Furthermore, four separate soft buffers would be required.

Figure 3B:
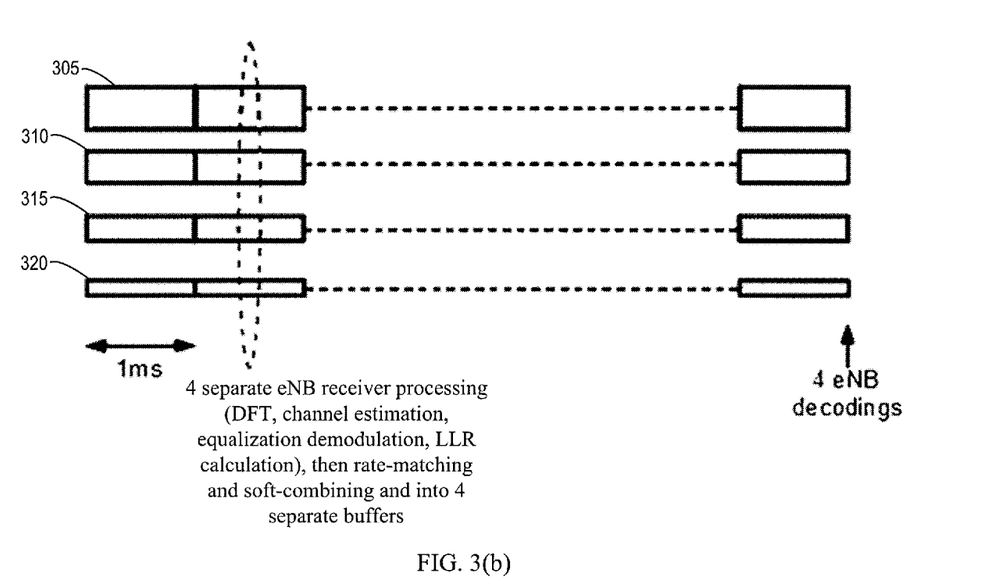
FIG. 3(b) illustrates example processing for blind decoding attempts with different numbers of resource elements (REs)/physical resource blocks (PRBs) according to some embodiments of the present disclosure.

FIG. 3(b) shows example processing for blind decoding attempts with different numbers of REs/PRBs. As shown in FIG. 3(b), in the case that the number of REs/PRBs is adjusted, separate receiver processing and then the rate-matching and soft-combining are performed for the different candidate TBSs 305, 310, 315 and 320. Four separate buffers are required.

Figure 3C:
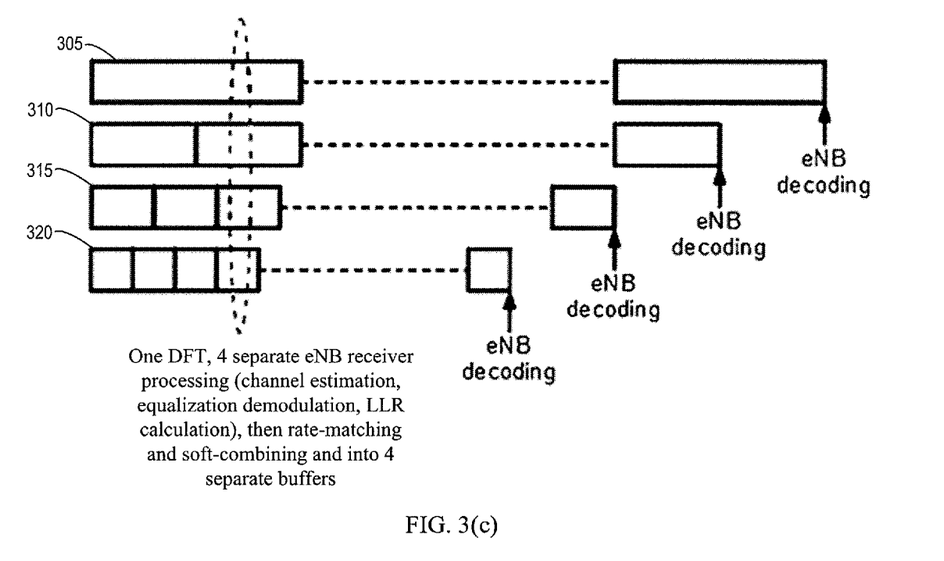
FIG. 3(c) illustrates example processing for blind decoding attempts with different numbers of resource units (RUs) according to some embodiments of the present disclosure.

FIG. 3(c) shows example processing for blind decoding attempts with different numbers of RUs. As shown in FIG. 3(c), in the case that the number of RUs is adjusted, in the receiver processing, the same DFT is performed. Other receiver processing and then the rate-matching and soft-combining are separated for the different TBSs 305, 310, 315 and 320. Four separate buffers are required.

Table 2 shows the comparisons of the receiver complexity with the different adjustment techniques as shown in FIGS. 3(a), 3(b) and 3(c).

In some embodiments, the terminal device 110 may determine amount of the data to be transmitted to the network device. The terminal device 110 may further determine the TBS based on the amount of the data and the reference TBS.

In some embodiments, the terminal device 110 may receive, from the network device 120, an indication that TBS adjustment is enabled by the network device. In response to receiving the indication that the TBS adjustment is enabled by the network device, the terminal device 110 may determine the amount of the data.

In some embodiments, the terminal device 110 may determine a set of candidate TBSs associated with the reference TBS, and then select the TBS from the set of candidate TBSs based on the amount of the data.

In some embodiments, the terminal device 110 may transmit, to the network device 120, an indication that TBS selection is enabled by the terminal device 110.

In some embodiments, the terminal device 110 may receive the random access response from the network device 120 by using downlink grant. In some other embodiments, the terminal device 110 may receive the reference TBS and the allocated resource from the network device 120 in uplink grant.

In some embodiments, the terminal device 110 may determine, from the allocated resource, a resource for transmitting the data. Then, the terminal device 110 may transmit the data to the network device in the determined resource by using the determined TBS.

In some embodiments, the terminal device 110 may receive, from the network device 120, an indication that

| Technique | Number of processing for 4 transport blocks | | | | | | | |
|---|---|---|---|---|---|---|---|---|
| | DFT | Channel Estimation | Equalization | Demodulation | LLR | Rate-Matching | Soft Buffer Combining | Turbo Decoding |
| Adjusting number of repetitions | 1 | 1 | 1 | 1 | 1 | 4 | 4 | 4 |
| Adjusting number of subcarriers/PRBs | 4 | 4 | 4 | 4 | 4 | 4 | 4 | 4 |
| Adjusting number of resource units | 1 | 4 (possible to reduce to 1) | 4 | 4 | 4 | 4 | 4 | 4 |

It can be seen that the adjustment of the number of repetitions results in minimum complexity at the network device 120 compared with other adjustment techniques.

Figure 4:
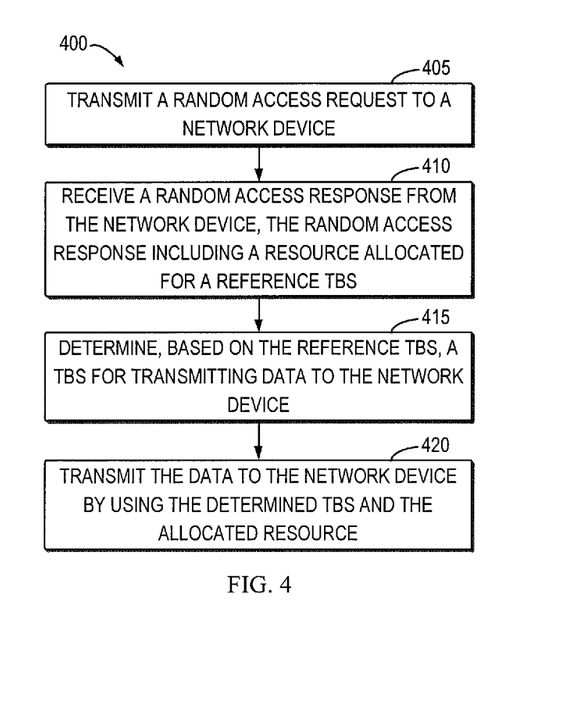
FIG. 4 illustrates a flowchart of an example method in accordance with some embodiments of the present disclosure.

FIG. 4 which shows a flowchart of an example method 400 in accordance with some embodiments of the present disclosure. The method 400 can be implemented at the terminal device 110 as shown in FIG. 1. For the purpose of discussion, the method 400 will be described with reference to FIG. 1.

At block 405, the terminal device 110 transmits a random access preamble to the network device 120. At block 410, the terminal device 110 receives a random access response from the network device 120. The random access response includes a resource allocated for a reference TBS. At block 415, the terminal device 110 determines, based on the reference TBS, a TBS for transmitting data to the network device 120. At block 420, the terminal device 110 transmits the data to the network device 120 by using the determined TBS and the allocated resource. In some embodiments, the random access response may also include the reference TBS.

resource adjustment is enabled by the network device 120. In response to receiving the indication that the resource adjustment is enabled by the network device 120, the terminal device 110 may determine the resource from the allocated resource based on the determined TBS and the reference TBS.

In some embodiments, the allocated resource includes a first reference number of repetitions. In these embodiments, the terminal device 110 may determine, based on the first reference number of repetitions, the determined TBS and the reference TBS, the number of repetitions for transmitting the data.

In some embodiments, the terminal device 110 may determine a second reference number of repetitions based on the first reference number of repetitions, the determined TBS and the reference TBS. The terminal device 110 may further determining a set of the candidate numbers of repetitions associated with the second reference number of repetitions, and select the number of repetitions from the set of the candidate numbers of repetitions.

In some embodiments, the terminal device 110 may determine a transmission power for the selected number of repetitions, and transmit the data to the network device 120 by using the determined TBS, the determined number of repetitions and the determined transmission power.

In some embodiments, the terminal device 110 may receive, from the network device 120, an indication that power adjustment is enabled by the network device 120. Then, the terminal device 110 may determine the transmission power based on the selected number of repetitions and the second reference number of repetitions.

In some embodiments, the terminal device 110 may detect a maximum TBS in system information. The maximum TBS may be larger than the reference TBS.

Figure 5:
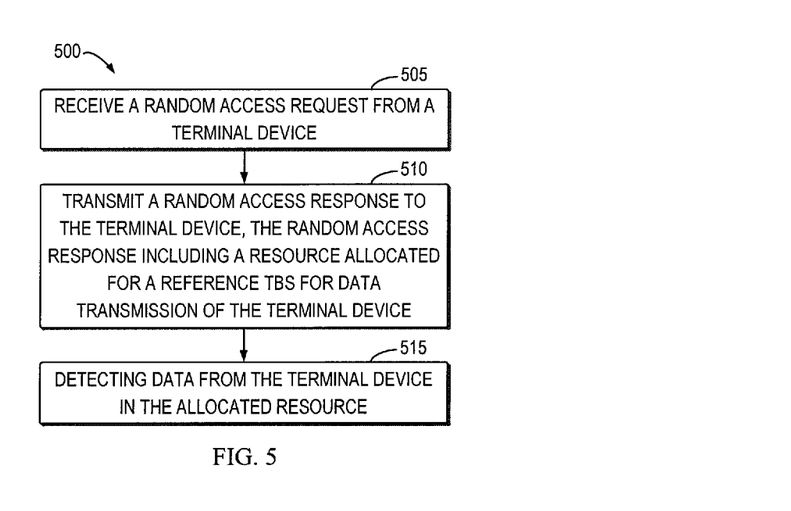
FIG. 5 illustrates a flowchart of an example method in accordance with some other embodiments of the present disclosure.

FIG. 5 which shows a flowchart of an example method 500 in accordance with some embodiments of the present disclosure. The method 500 can be implemented at the network device 120 as shown in FIG. 1. For the purpose of discussion, the method 500 will be described with reference to FIG. 1.

At block 505, the network device 120 receives a random access preamble from the terminal device 110. At block 510, the network device 120 transmits a random access response to the terminal device 110. The random access response includes a resource allocated for a reference TBS for data transmission of the terminal device 110. At block 515, the network device 120 detects data from the terminal device 110 in the allocated resource. In some embodiments, the random access response may also include the reference TBS.

In some embodiments, the network device 120 may determine a set of candidate TBSs associated with the reference TBS. Then, the network device 120 may detect, based on the set of candidate TBSs, the data from the terminal device 110 in the allocated resource.

In some embodiments, the network device 120 may receive, from the terminal device 110, an indication that TBS selection is enabled by the terminal device 110. In response to receiving the indication that the TBS selection is enabled by the terminal device 110, the network device 120 may determine the set of candidate TBSs.

In some embodiments, the network device 120 may transmit the random access response to the terminal device 110 by using downlink grant. In some other embodiments, the network device 120 may transmit the reference TBS and the allocated resource to the terminal device 110 in uplink grant.

In some embodiments, the network device 120 may transmit, to the terminal device 110, an indication that TBS adjustment is enabled by the network device 120.

In some embodiments, the network device 120 may transmit, to the terminal device 110, an indication that resource adjustment is enabled by the network device 120.

In some embodiments, the network device 120 may transmit, to the terminal device 110, an indication that power adjustment is enabled by the network device 120.

In some embodiments, the network device 120 may broadcast a maximum TBS in system information. The maximum TBS may be larger than the reference TBS.

It is to be understood that all operations and features related to the terminal device 110 and the network device 120 described above with reference to FIGS. 1, 2 and 3(*a*)-3(*c*) are likewise applicable to the methods 400 and 500 and have similar effects. For the purpose of simplification, the details will be omitted.

Figure 6:
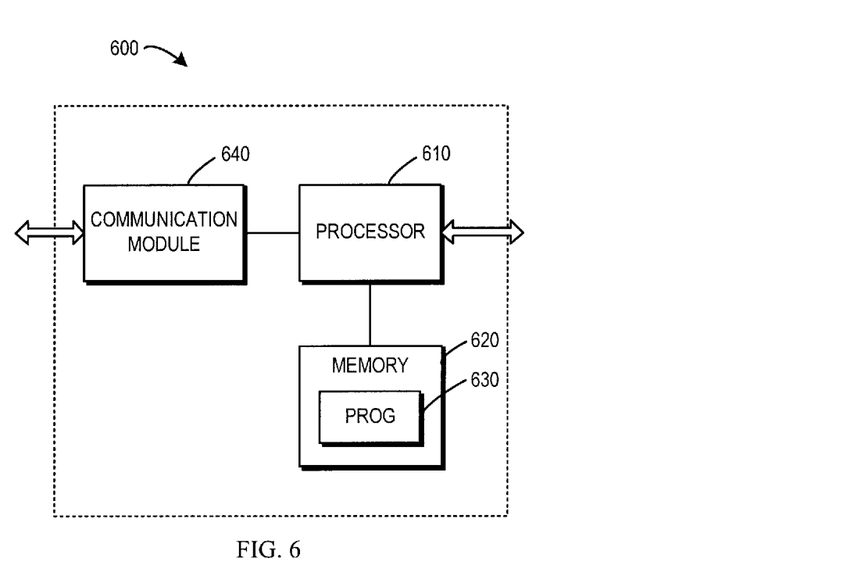
FIG. 6 illustrates a simplified block diagram of a device that is suitable for implementing embodiments of the present disclosure.

FIG. 6 is a simplified block diagram of a device 600 that is suitable for implementing embodiments of the present disclosure. The device 600 can be implemented at or as at least a part of the terminal device 110 or a part of the network device 120 as shown in FIG. 1.

As shown, the device 600 includes a processor 610, a memory 620 coupled to the processor 610, a communication module 640 coupled to the processor 610, and a communication interface (not shown) coupled to the communication module 640. The memory 620 stores at least a program 630. The communication module 640 is for bidirectional communications. The communication interface may represent any interface that is necessary for communication with a network element, such as Uu interface for communication between the eNB and the UE.

The program 630 is assumed to include program instructions that, when executed by the associated processor 610, enable the device 600 to operate in accordance with the embodiments of the present disclosure, as discussed herein with reference to FIGS. 1-5. The embodiments herein may be implemented by computer software executable by the processor 610 of the device 600, or by hardware, or by a combination of software and hardware. The processor 610 may be configured to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the terminal device 110, the processor 610 and the memory 620 may cooperate to cause the device 600 to implement the method 400 as discussed herein with reference to FIG. 4. When the device 600 acts as the network device 120, the processor 610 and the memory 620 may cooperate to cause the device 600 to implement the method 500 as discussed herein with reference to FIG. 5.

All operations and features related to the terminal device 110 and the network device 120 described above with reference to FIGS. 1, 2 and 3(*a*)-3(*c*) are likewise applicable to the device 600 and have similar effects. For the purpose of simplification, the details will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 500 as described above with reference to FIGS. 4 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

Example 1. A method comprising: at a terminal device, transmitting a random access preamble to a network device; receiving a random access response from the network device, the random access response including a resource allocated for a reference transport block size (TBS); determining, based on the reference TBS, a TBS for transmitting data to the network device; and transmitting the data to the network device by using the determined TBS and the allocated resource.

Example 2. The method of example 1, wherein the random access response further includes the reference TBS.

Example 3. The method of example 2, wherein receiving the random access response comprises: receiving the reference TBS and the allocated resource from the network device in uplink grant.

Example 4. The method of any of examples 1-3, wherein receiving the random access response comprises: receiving the random access response from the network device by using downlink grant.

Example 5. The method of any of examples 1-4, wherein determining the TBS comprises: determining amount of the data to be transmitted to the network device; and determining the TBS based on the amount of the data and the reference TBS.

Example 6. The method of example 5, wherein determining the amount of the data comprises: receiving, from the network device, an indication that TBS adjustment is enabled by the network device; and in response to receiving the indication that the TBS adjustment is enabled by the network device, determining the amount of the data.

Example 7. The method of example 5 or 6, wherein determining the TBS based on the amount of the data and the reference TBS comprises: determining a set of candidate TBSs associated with the reference TBS; and selecting the TBS from the set of candidate TBSs based on the amount of the data.

Example 8. The method of example 4, further comprising: transmitting, to the network device, an indication that TBS selection is enabled by the terminal device.

Example 9. The method of any of examples 1-8, wherein transmitting the data comprises: determining, from the allocated resource, a resource for transmitting the data; and transmitting the data to the network device in the determined resource by using the determined TBS.

Example 10. The method of example 9, wherein determining the resource comprises: receiving, from the network device, an indication that resource adjustment is enabled by the network device; and in response to receiving the indication that the resource adjustment is enabled by the network device, determining the resource from the allocated resource based on the determined TBS and the reference TBS.

Example 11. The method of example 10, wherein the allocated resource includes a first reference number of repetitions, and determining the resource comprises: determining, based on the first reference number of repetitions, the determined TBS and the reference TBS, the number of repetitions for transmitting the data.

Example 12. The method of example 11, wherein determining the number of repetitions comprises: determining a second reference number of repetitions based on the first reference number of repetitions, the determined TBS and the reference TBS; determining a set of the candidate numbers of repetitions associated with the second reference number of repetitions; and selecting the number of repetitions from the set of the candidate numbers of repetitions.

Example 13. The method of example 12, wherein transmitting the data to the network device in the determined resource comprises: determining a transmission power for the selected number of repetitions; and transmitting the data to the network device by using the determined TBS, the determined number of repetitions and the determined transmission power.

Example 14. The method of example 13, wherein determining the transmission power comprises: receiving, from the network device, an indication that power adjustment is enabled by the network device; and determining the transmission power based on the selected number of repetitions and the second reference number of repetitions.

Example 15. The method of any of examples 1-14, further comprising: detecting a maximum TBS in system information, the maximum TBS being larger than the reference TBS.

Example 16. A method comprising: at a network device, receiving a random access preamble from a terminal device; transmitting a random access response to the terminal device, the random access response including a resource allocated for a reference transport block size (TBS) for data transmission of the terminal device; and detecting data from the terminal device in the allocated resource.

Example 17. The method of example 16, wherein the random access response further includes the reference TBS.

Example 18. The method of example 17, wherein transmitting the random access response comprises: transmitting the reference TBS and the allocated resource to the terminal device in uplink grant.

Example 19. The method of any of examples 16-18, wherein transmitting the random access response comprises: transmitting the random access response to the terminal device by using downlink grant.

Example 20. The method of any of examples 16-19, wherein detecting the data comprises: determining a set of candidate TBSs associated with the reference TBS; and detecting, based on the set of candidate TBSs, the data from the terminal device in the allocated resource.

Example 21. The method of example 20, wherein determining the set of candidate TBSs comprises: receiving, from the terminal device, an indication that TBS selection is enabled by the terminal device; and in response to receiving the indication that the TBS selection is enabled by the terminal device, determining the set of candidate TBSs.

Example 22. The method of any of examples 16-21, further comprising: transmitting, to the terminal device, an indication that TBS adjustment is enabled by the network device.

Example 23. The method of any of examples 16-22, further comprising: transmitting, to the terminal device, an indication that resource adjustment is enabled by the network device.

Example 24. The method of any of examples 16-23, further comprising: transmitting, to the terminal device, an indication that power adjustment is enabled by the network device.

Example 25. The method of any of examples 16-24, further comprising: broadcasting a maximum TBS in system information, the maximum TBS being larger than the reference TBS.

Example 26. A device, comprising: at least one processor; and at least one memory including computer program code; the at least one memory and the computer program code configured to, with the at least one processor, cause the device to perform the method of any of examples 1-15.

Example 27. A device, comprising: at least one processor; and at least one memory including computer program code; the at least one memory and the computer program code configured to, with the at least one processor, cause the device to perform the method of any of examples 16-25.

Example 28. A computer readable storage medium storing a computer program thereon, the computer program, when executed by a processor, causing the processor to perform the method of any of examples 1-15.

Example 29. A computer readable storage medium storing a computer program thereon, the computer program, when executed by a processor, causing the processor to perform the method of any of examples 16-25.

Example 30. An apparatus comprising: means for transmitting, by a terminal device, a random access preamble to a network device; means for receiving a random access response from the network device, the random access response including a resource allocated for a reference transport block size (TBS); means for determining, based on the reference TBS, a TBS for transmitting data to the network device; and means for transmitting the data to the network device by using the determined TBS and the allocated resource.

Example 31. The apparatus of example 30, wherein the random access response further includes the reference TBS.

Example 32. The apparatus of example 31, wherein the means for receiving the random access response comprises: means for receiving the reference TBS and the allocated resource from the network device in uplink grant.

Example 33. The apparatus of any of examples 30-32, wherein the means for receiving the random access response comprises: means for receiving the random access response from the network device by using downlink grant.

Example 34. The apparatus of any of examples 30-33, wherein the means for determining the TBS comprises: means for determining amount of the data to be transmitted to the network device; and means for determining the TBS based on the amount of the data and the reference TBS.

Example 35. The apparatus of example 34, wherein the means for determining the amount of the data comprises: means for receiving, from the network device, an indication that TBS adjustment is enabled by the network device; and means for in response to receiving the indication that the TBS adjustment is enabled by the network device, determining the amount of the data.

Example 36. The apparatus of example 34 or 35, wherein the means for determining the TBS based on the amount of the data and the reference TBS comprises: means for determining a set of candidate TBSs associated with the reference TBS; and means for selecting the TBS from the set of candidate TBSs based on the amount of the data.

Example 37. The apparatus of example 36, further comprising: means for transmitting, to the network device, an indication that TBS selection is enabled by the terminal device.

Example 38. The apparatus of any of examples 30-37, wherein the means for transmitting the data comprises: means for determining, from the allocated resource, a resource for transmitting the data; and means for transmitting the data to the network device in the determined resource by using the determined TBS.

Example 39. The apparatus of example 38, wherein the means for determining the resource comprises: means for receiving, from the network device, an indication that resource adjustment is enabled by the network device; and means for in response to receiving the indication that the resource adjustment is enabled by the network device, determining the resource from the allocated resource based on the determined TBS and the reference TBS.

Example 40. The apparatus of example 39, wherein the allocated resource includes a first reference number of repetitions, and the means for determining the resource comprises: means for determining, based on the first reference number of repetitions, the determined TBS and the reference TBS, the number of repetitions for transmitting the data.

Example 41. The apparatus of example 40, wherein the means for determining the number of repetitions comprises: means for determining a second reference number of repetitions based on the first reference number of repetitions, the determined TBS and the reference TBS; means for determining a set of the candidate numbers of repetitions associated with the second reference number of repetitions; and means for selecting the number of repetitions from the set of the candidate numbers of repetitions.

Example 42. The apparatus of example 41, wherein the means for transmitting the data to the network device in the determined resource comprises: means for determining a transmission power for the selected number of repetitions; and means for transmitting the data to the network device by using the determined TBS, the determined number of repetitions and the determined transmission power.

Example 43. The apparatus of example 42, wherein the means for determining the transmission power comprises: means for receiving, from the network device, an indication that power adjustment is enabled by the network device; and means for determining the transmission power based on the selected number of repetitions and the second reference number of repetitions.

Example 44. The apparatus of any of examples 30-43, further comprising: means for detecting a maximum TBS in system information, the maximum TBS being larger than the reference TBS.

Example 45. A apparatus comprising: means for receiving, by a network device, a random access preamble from a terminal device; means for transmitting a random access response to the terminal device, the random access response including a resource allocated for a reference transport block size (TBS) for data transmission of the terminal device; and means for detecting data from the terminal device in the allocated resource.

Example 46. The apparatus of example 45, wherein the random access response further includes the reference TBS.

Example 47. The apparatus of example 46, wherein the means for transmitting the random access response comprises: means for transmitting the reference TBS and the allocated resource to the terminal device in uplink grant.

Example 48. The apparatus of any of examples 45-47, wherein the means for transmitting the random access response comprises: means for transmitting the random access response to the terminal device by using downlink grant.

Example 49. The apparatus of any of examples 45-48, wherein the means for detecting the data comprises: means for determining a set of candidate TBSs associated with the reference TBS; and means for detecting, based on the set of candidate TBSs, the data from the terminal device in the allocated resource.

Example 50. The apparatus of example 49, wherein the means for determining the set of candidate TBSs comprises: means for receiving, from the terminal device, an indication that TBS selection is enabled by the terminal device; and means for in response to receiving the indication that the TBS selection is enabled by the terminal device, determining the set of candidate TBSs.

Example 51. The apparatus of any of examples 45-50, further comprising: means for transmitting, to the terminal device, an indication that TBS adjustment is enabled by the network device.

Example 52. The apparatus of any of examples 45-51, further comprising: means for transmitting, to the terminal device, an indication that resource adjustment is enabled by the network device.

Example 53. The apparatus of any of examples 45-52, further comprising: means for transmitting, to the terminal device, an indication that power adjustment is enabled by the network device.

Example 54. The apparatus of any of examples 45-53, further comprising: means for broadcasting a maximum TBS in system information, the maximum TBS being larger than the reference TBS.

What is claimed is:
1. A method comprising:
at a terminal device,
transmitting a random access preamble to a network device;
receiving a random access response from the network device, the random access response including a resource allocated for a reference transport block size (TBS);
receiving, from the network device, an indication that TBS adjustment is enabled by the network device;
determining, based on the reference TBS and the indication that TBS adjustment is enabled by the network device, a TBS for transmitting data to the network device; and
transmitting the data to the network device by using the determined TBS and the allocated resource.
2. The method of claim 1, wherein the random access response further includes the reference TBS.
3. The method of claim 1, wherein determining the TBS comprises:
determining an amount of the data to be transmitted to the network device; and
determining the TBS based on the amount of the data and the reference TBS.
4. The method of claim 3, wherein the amount of the data is determined in response to receiving the indication that the TBS adjustment is enabled by the network device.
5. The method of claim 3, wherein determining the TBS based on the amount of the data and the reference TBS comprises:
determining a set of candidate TBSs associated with the reference TBS; and
selecting the TBS from the set of candidate TBSs based on the amount of the data.
6. The method of claim 5, further comprising:
transmitting, to the network device, an indication that TBS selection is enabled by the terminal device.

7. The method of claim 1, wherein transmitting the data comprises:
  determining, from the allocated resource, a resource for transmitting the data; and
  transmitting the data to the network device in the determined resource by using the determined TBS.

8. The method of claim 7, wherein determining the resource comprises:
  receiving, from the network device, an indication that resource adjustment is enabled by the network device; and
  in response to receiving the indication that the resource adjustment is enabled by the network device, determining the resource from the allocated resource based on the determined TBS and the reference TBS.

9. The method of claim 8, wherein the allocated resource includes a first reference number of repetitions, and determining the resource comprises:
  determining, based on the first reference number of repetitions, the determined TB S and the reference TBS, the number of repetitions for transmitting the data.

10. The method of claim 9, wherein determining the number of repetitions comprises:
  determining a second reference number of repetitions based on the first reference number of repetitions, the determined TBS and the reference TBS;
  determining a set of the candidate numbers of repetitions associated with the second reference number of repetitions; and
  selecting the number of repetitions from the set of the candidate numbers of repetitions.

11. The method of claim 10, wherein transmitting the data to the network device in the determined resource comprises:
  determining a transmission power for the selected number of repetitions; and
  transmitting the data to the network device by using the determined TBS, the determined number of repetitions and the determined transmission power.

12. The method of claim 11, wherein determining the transmission power comprises:
  receiving, from the network device, an indication that power adjustment is enabled by the network device; and
  determining the transmission power based on the selected number of repetitions and the second reference number of repetitions.

13. The method of claim 1, further comprising:
  detecting a maximum TBS in system information, the maximum TBS being larger than the reference TBS.

14. A method comprising:
  at a network device,
    receiving a random access preamble from a terminal device;
    transmitting a random access response to the terminal device, the random access response including a resource allocated for a reference transport block size (TBS) for data transmission of the terminal device;
    determining a set of candidate TBSs associated with the reference TBS, wherein determining the set of candidate TBSs comprises at least receiving, from the terminal device, an indication that TBS selection is enabled by the terminal device; and
    detecting data from the terminal device in the allocated resource based on the set of candidate TBSs associated with the reference TBS.

15. The method of claim 14, wherein the set of candidate TBSs is determined in response to receiving the indication that the TBS selection is enabled by the terminal device.

16. The method of claim 14, further comprising:
  transmitting, to the terminal device, an indication that at least one of TBS adjustment, resource adjustment or power adjustment is enabled by the network device.

17. The method of claim 14, further comprising:
  broadcasting a maximum TBS in system information, the maximum TBS being larger than the reference TBS.

18. A device, comprising:
  at least one processor; and
  at least one memory including computer program code;
  the at least one memory and the computer program code configured to, with the at least one processor, cause the device to:
  transmit a random access preamble to a network device;
  receive a random access response from the network device, the random access response including a resource allocated for a reference transport block size (TBS);
  receive, from the network device, an indication that TBS adjustment is enabled by the network device;
  determine, based on the reference TBS and the indication that TBS adjustment is enabled by the network device, a TBS for transmitting data to the network device; and
  transmit the data to the network device by using the determined TBS and the allocated resource.

19. A device, comprising:
  at least one processor; and
  at least one memory including computer program code;
  the at least one memory and the computer program code configured to, with the at least one processor, cause the device to:
  receive a random access preamble from a terminal device;
  transmit a random access response to the terminal device, the random access response including a resource allocated for a reference transport block size (TBS) for data transmission of the terminal device;
  determine a set of candidate TBSs associated with the reference TBS, wherein determining the set of candidate TBSs comprises at least receiving, from the terminal device, an indication that TBS selection is enabled by the terminal device; and
  detect data from the terminal device in the allocated resource based on the set of candidate TBSs associated with the reference TBS.

\* \* \* \* \*

UNITED STATES PATENT AND TRADEMARK OFFICE
CERTIFICATE OF CORRECTION

PATENT NO. : 11,924,886 B2
APPLICATION NO. : 17/048509
DATED : March 5, 2024
INVENTOR(S) : Rapeepat Ratasuk et al.

Page 1 of 1

It is certified that error appears in the above-identified patent and that said Letters Patent is hereby corrected as shown below:

In the Claims

In Column 18, Line 57, Claim 4, delete "TB S" and insert -- TBS --, therefor.

In Column 18, Line 63, Claim 5, delete "TB S" and insert -- TBS --, therefor.

In Column 19, Line 20, Claim 9, delete "TB S" and insert -- TBS --, therefor.

Signed and Sealed this
Twenty-second Day of October, 2024

Katherine Kelly Vidal
*Director of the United States Patent and Trademark Office*